United States Patent [19]

Fishler et al.

[11] Patent Number: 4,871,698

[45] Date of Patent: Oct. 3, 1989

[54] CARBON BONDED REFRACTORY BODIES

[75] Inventors: Mark K. Fishler; Dale B. Hoggard, both of Pittsburgh, Pa.

[73] Assignee: Vesuvius Crucible Company, Pittsburgh, Pa.

[21] Appl. No.: 120,733

[22] Filed: Nov. 9, 1987

[51] Int. Cl.$^4$ ............................................. C04B 35/58
[52] U.S. Cl. ...................................... 501/97; 501/98; 501/100
[58] Field of Search .................... 501/96, 97, 98, 100

[56] References Cited

U.S. PATENT DOCUMENTS

| | | | |
|---|---|---|---|
| 4,528,244 | 7/1985 | Winkelbauer | 428/446 |
| 4,540,674 | 9/1985 | Watanabe et al. | 501/97 |
| 4,605,635 | 8/1986 | Zenbutsu et al. | 501/96 |
| 4,608,353 | 8/1986 | Nagayama | 501/97 |

FOREIGN PATENT DOCUMENTS

| | | | |
|---|---|---|---|
| 257035 | 8/1963 | Australia | 501/96 |
| 4509 | 10/1979 | European Pat. Off. | 501/96 |
| 2528170 | 1/1977 | Fed. Rep. of Germany | 501/96 |
| 2727314 | 1/1979 | Fed. Rep. of Germany | 501/97 |
| 42-16044 | 9/1967 | Japan | 501/97 |
| 59-11071 | 3/1968 | Japan . | |
| 54-33512 | 3/1979 | Japan | 501/97 |
| 54-38308 | 3/1979 | Japan | 501/97 |
| 54-52110 | 4/1979 | Japan | 501/97 |
| 57-129873 | 8/1982 | Japan | 501/92 |
| 57-205377 | 12/1982 | Japan | 501/97 |
| 58-49669 | 3/1983 | Japan . | |
| 58-84914 | 5/1983 | Japan | 501/100 |
| 59-16176 | 7/1984 | Japan | 501/97 |
| 60-195056 | 10/1985 | Japan | 501/97 |

Primary Examiner—Mark L. Bell
Assistant Examiner—Deborah Jones
Attorney, Agent, or Firm—Webb, Burden, Ziesenheim & Webb

[57] ABSTRACT

The invention is directed to improved carbon containing refractory compositions and sintered bodies made therefrom which are particularly resistant to slag and metal erosion and to thermal shock. This is achieved by combining grains or powders of SiAlON and/or silicon nitride with elemental carbon in the form of graphite, carbon black or charcoal. The particulate materials are mixed with a carbonaceous binder such as resin or pitch, pressed to shape and fired in a reducing atmosphere. Small amounts of antioxidants are also added to protect the carbon bond phase against slag attack. Additional amounts of a less expensive refractory grain or powder are also optionally added to the mix to dilute the more expensive SiAlON and/or silicon nitride.

6 Claims, 1 Drawing Sheet

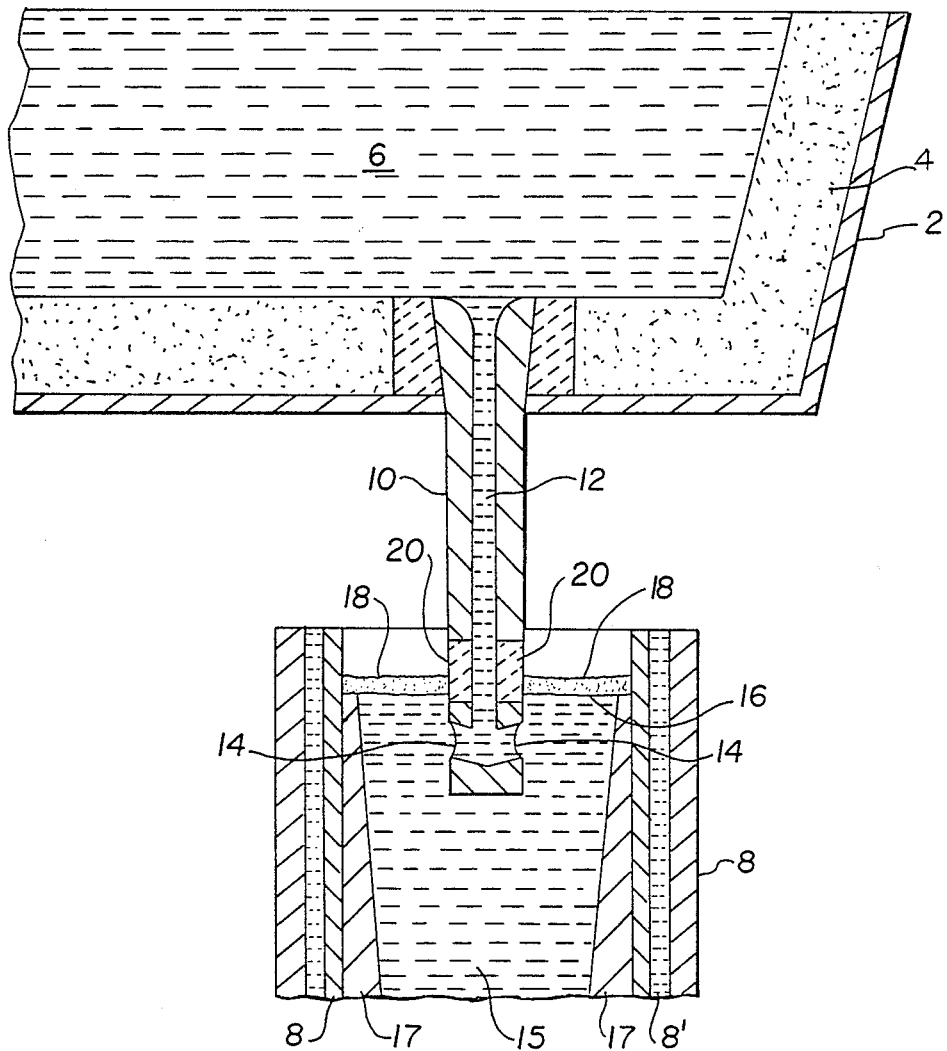

CARBON BONDED REFRACTORY BODIES

This is a continuation of co-pending application Ser. No. 853,908, filed on Apr. 21, 1986, now abandoned.

BACKGROUND OF THE INVENTION

Our invention relates generally to refractory bodies containing carbon and, more particularly, to improved refractory bodies which comprise pressed and fired mixtures of SiAlON and/or silicon nitride with elemental carbon forming the bond phase. Heretofore, the use of carbon-bonded refractories for metallurgical applications has been well-known. Such known carbon-containing refractories usually consist of a mixture of refractory grains such as aluminum oxide, zirconium oxide, clays, silicon carbide, silicon oxide, or other known refractories, and carbon from flake graphite, amorphous graphite, carbon black, coke, or like source. A carbonaceous binder derived from pitch or resin also is employed to bind together the mixture of refractory grain and carbon. It has been found that these known carbon-bonded refractories have certain advantages over conventional oxide refractories. Carbon-containing refractories are more resistant to thermal shock and it has been observed that the carbon content also prevents metal wetting and slag attack, resulting in an improved service life of the refractory bodies.

Such carbon-containing refractory bodies typically find use as crucibles for the melting and casting of ferrous and nonferrous metals; for slide gate plates in the flow control of molten metals from steel ladles to tundishes, and from tundishes to continuous casting molds; for submerged pouring nozzles in the casting of molten metal from ladles to tundishes and from tundishes to continuous casting molds; in furnace runners and troughs for transferring molten metals from furnaces to ladles; and for blast furnace bricks used in the reduction of iron ore to iron, to mention a few.

It is a known practice in the materials science/ceramics art to manufacture refractory bodies, such as a submerged pouring nozzle, for example, as a composite structure in order to increase the service life of the nozzle. The body of the nozzle may be of a carbon bonded alumina and graphite refractory material with an erosion resistant, intermediate section formed of carbon zirconia and graphite refractory. The intermediate section is in the region where the submerged nozzle is in contact with the slag/metal interface. The zirconia-graphite section exhibits improved slag erosion resistance compared with nozzles which are entirely of carbon-bonded alumnina-graphite refractory. Conventional carbon bonded zirconia and graphite slagline sleeves, while offering high erosion resistance, unfortunately often lose mechanical strength and fracture during long casting sequences. Such premature failure results in a shortened casting sequence which is uneconomical and is particularly burdensome since the nozzle must usually be replaced prior to its projected erosion life. It has been observed that the fractured sleeve still contains a large proportion of refractory which has not been eroded but becomes useless due to the decreased mechanical strength caused by a crystallographic change in the structure of known zirconia-graphite refractories. This crystallographic change results from a transition from a high temperature tetragonal structure to a low temperature monoclinic crystal structure, accompanied by approximately a 3.5% volume expansion which causes cracking and subsequent failure of the sleeve. Thus, in the case of the submerged pouring nozzle, it would be beneficial if the useful service life of a slagline sleeve could be increased by avoiding the phase transformation while, at the same time, retaining a high resistance to slag erosion during service. In other applications, such as in crucibles and slide gate plates it would be desirable to increase resistance to certain non-ferrous metals and to thermal cracking.

SUMMARY OF THE INVENTION

Our invention soles many of the shortcomings heretofore observed in metallurgical ceramic bodies by providing an improved high temperature, carbon-containing refractory which is particularly suitable for use in molten slag environments. Our invention provides improved refractory compositions, combining SiAlON and/or silicon nitride, grain or fine powder, with elemental carbon, such as contained in graphite, and a bond phase. The mixture also contains a small amount of antioxidant, such as a boron compound. Optionally, additional, less expensive refractory grain or powder, such as clay, alumina, zirconia, silicon carbide, or the like may be added to dilute the more expensive mixture of SiAlON and/or silicon nitride and carbon. The constituents are blended with a small amount of carbonaceous binder, such as resin or pitch, and press formed into an appropriate refractory shape such as a pouring nozzle, slide gate, crucible, or the like, and then fired in a reducing atmosphere. The resultant, carbon-bonded refractory body provides excellent erosion resistance and thermal shock resistance in molten metals and slags.

A preferred compositional range for the carbon containing refractory of our invention is as follows, in weight percent:

| | |
|---|---|
| (a) Carbon | about 4–50% |
| (b) Silicon Nitride ($Si_3N_4$) and/or SiAlON ($Si_{6-z}Al_zO_zN_{8-z}$) | about 20–90% |
| (c) Antioxidant, selected from SiC, $SiO_2$, boron containing compounds, or the like | about 2–8% |
| (d) Carbonaceous binder, selected from pitch, resin, or the like | about 0–10% |
| (e) One or more other refractory grains or powders, such as clay, alumina, zirconia, silica, silicon carbide, mullite, chromia, or the like known refractory | about 0–70% |

BRIEF DESCRIPTION OF THE DRAWING

The drawing figure depicts a partially fragmented, cross-sectional, side view of a bottom pour tundish with a submerged pouring nozzle having a slagline sleeve of the present invention delivering molten metal to a continuous casting mold.

DETAILED DESCRIPTION OF THE INVENTION

It is readily observable that the area of a refractory body located at the molten metal/slag interface or "slagline" undergoes erosion at a higher rate than the balance of the refractory body. Typical of such high erosion applications is the submerged pouring nozzle 10 depicted in the drawing. As shown, a bath of molten metal 6 is contained within a bottom pour tundish 2 having a conventional refractory lining 4, which feeds the molten metal by way of nozzle 10 to a continuous casting mold 8. The continuous casting mold includes a water jacket 8' for continuous chilling of the mold. The sub-entry nozzle 10 has an internal bore 12 and exit ports 14 communicating therewith. The molten metal 6 flows from the tundish 2 to the submerged nozzle and exits the nozzle beneath the molten metal surface 16 via ports 14 within the interior of the molten core 15. Use of the submerged nozzle thus prevents oxidation and splashing of the molten metal. During the initial casting stage, the ingot contains a solidified outer metal skin or strand 17 and internal molten core 15 which gradually solidifies as the strand moves away from the mold.

It is common in continuous casting operations to add a layer of mold powder above the surface 6 of the molten metal in order to capture nonmetallic inclusions in the molten metal. The mold powder also serves as a lubricant and provides protection for the strand of metal as it is extracted from the mold. Commonly used mold powders are comprised of mixed oxides having a relatively low melting point, which forms a molten slag layer 18 that floats on the surface 16 of the molten portion 15 of the ingot. The mold powder in slag layer 18 is gradually depleted as the casting descends beneath the mold and additional powder must therefore be continuously fed to the top of the mold 8 during the duration of the casting operation. It is seen that the portion 20 of the nozzle 10 is continuously exposed to the molten slag layer 18 during the casting sequence. Portion 20 of the submerged entry nozzle is referred to as the slagline area and undergoes erosion at a much higher rate than the balance of the pouring nozzle. The limiting factor in the life of refractories in this type of environment is generally determined by the rate of erosion at the slagline 18. This factor has been recognized heretofore and, as a result, sub-entry nozzles have been manufactured in composite form such that the main body of the nozzle 10 may be composed of a carbon-bonded alumina and graphite refractory, while the portion exposed to the slagline 18 may consist of a carbon-bonded zirconia and graphite sleeve 20 which is pressed and sintered together with the balance of the nozzle body. Typically chemical compositions for the body of the alumina-graphite nozzle and the zirconia-graphite sleeve 20 commonly used in the known sub-entry nozzle application of FIG. 1 are give below in Table I:

TABLE I

|  | Alumina-Graphite | Zirconia-Graphite |
|---|---|---|
| C | 32 (weight %) | 16.5 (weight %) |
| Al$_2$O$_3$ | 52 (weight %) | 1.0 (weight %) |
| SiO$_2$ | 14 (weight %) | 2.0 (weight %) |
| Minor | 2 (weight %) | 1.5 (weight %) |
| ZrO$_2$ | — | 75.0 (weight %) |
| CaO | — | 4.0 (weight %) |

While known slagline sleeves of zirconia-graphite of the type having a composite composition set forth in Table I, offer superior erosion resistance over nozzles composed entirely of alumina-graphite, the life of the nozzle is not completely satisfactory due to premature cracking and replacement costs are high. We have discovered that erosion resistance as well as thermal shock and dimensional stability properties of carbon-bonded refractory bodies can be significantly improved through the use of SiAlON and/or silicon nitride grain or fine powder with a carbon bond. We have also discovered that, as an optional addition, less expensive refractory grains may also be added as a diluting material to mixtures of SiAlON and/or silicon nitride grain plug elemental carbon, such as graphite. The given mixture is blended with a conventional carbonaceous binder, such as resin or pitch, and pressed into an appropriate refractory body such as the slagline sleeve 20 within the nozzle 10 of FIG. 1. The pressed body is then fired in an appropriate reducing atmosphere in a conventional manner. Firing temperatures are usually between about 800° C. and 1500° C.

SiAlON is a known refractory composition consisting of a solid solution and/or dispersion of aluminum oxide and aluminum nitride throughout a silicon nitride matrix. Generally, it is considered to be a refractory material composed of at least 80% by weight of a silicon-aluminum oxynitride which has a crystal structure based upon beta silicon nitride (Si$_3$N$_4$), but of increased unit cell dimension which obeys the formula:

$$Si_{6-z}Al_zO_zN_{8-z},$$

where z is greater than zero but less than or equal to five.

Beta phase silicon nitride (Si$_3$N$_4$) has the same hexagonal crystal structure as SiAlON with a z value equal to zero and a unit cell dimension which is slightly smaller than SiAlON. With increasing amounts of alloying additions, for example, alumina, the unit cell dimensions of silicon nitride will increase and approach that of SiAlON. Due to the similarities in cell structure, we have found that SiAlON and beta silicon nitride grains or powders can be used separately or interchangeably in mixtures with other common refractory grains or powders and with the elemental carbon addition for the purposes of the present invention.

In the examples described below, the particle sizes of the SiAlON, silicon nitride and other refractory grains and powders used in making the various test compositions ranged from less than about a −4 mesh (U.S. Standard Sieve Size) for the grain, down to about 0.5 microns for the fine powders. Grains and powders having a particle size intermediate those two extremes are suitable for use as starting materials in practicing our invention. The elemental carbon addition in the mixture may be in the form of graphite, carbon black, petroleum coke or the like. In the examples presented below, the carbon additions were made using graphite in the form of natural vein ore or flake graphite, commonly referred to as crystalline graphite, with a carbon content of greater than about 70% by weight. The particle size of the graphite is preferably less than −8 mesh, U.S. Standard. The flake graphite has a platelet structure which is preferred in certain applications due to its high thermal conductivity. The mold powder employed in the various erosion test discussed below is a powder commonly used in commercial continuous casting operations having a CaO to Si ratio of 0.5 to 2.0, with a fluorine content between about 0–20%.

In order to compare the compositions of the present invention with the refractories of the prior art in a typical application such as in a slagline sleeve 20, laboratory testing was carried out on several slagline materials containing graphite and carbon bonded SiAlON and silicon nitride. The testing consisted of isostatically pressing submerged entry nozzles of alumina-graphite with a SiAlON-graphite or SiAlON plus silicon nitride-graphite slagline sleeve. A conventional zirconia-graphite slagline sleeve having a composition set forth in Table I was used as the comparative standard of the prior art. Test bars 25 mm×25 mm were cut from each of the slagline sleeves formed from materials of the present invention and from the zirconia-graphite standard. The laboratory test consisted of rotating one bar of the material of the invention and one bar of the zirconia-graphite standard in a molten steel, both having a layer of mold powder floating thereon. Upon completion of the testing, the depth of slag erosion was measured. The results are shown below for the various examples.

EXAMPLE I

A SiAlON-graphite sleeve of the composition set forth below in Table II (in weight percent) was tested against the zirconia-graphite standard of Table I.

TABLE II

|  | Weight % |
|---|---|
| C = | 29.3% |
| SiAlON (Z = 2) = | 60.5% |
| SiO$_2$ = | 4.4% |
| Boron oxide (B$_2$O$_3$) = | 2.0% |
| Other oxides = | 3.8% |

The SiAlON-graphite test bar, along with the standard zirconia-graphite bar specimen were rotated at 30 rpm in molten steel at a temperature of approximately 1680° C. for 10 minutes. The following erosion measurements were obtained.

|  | Zirconia-Graphite Sleeve | SiAlON Sleeve |
|---|---|---|
| Slag Erosion Rate | 1.512 in/hr | 0.66 in/hr |

The SiAlON-carbon-bonded refractory also contained 4.4% silica plus other oxides in the amount of about 3.8% which serves to somewhat dilute the relatively expensive SiAlON grain. The test composition set forth in Table II also contained approximately 2% boron oxide (B$_2$O$_3$) which acts as an oxidation inhibitor to protect the carbon bond in the sintered body and prolong the ability of the refractory body to resist erosion. It can be seen that the SiAlON-rich carbon bonded test rod of Table II exhibited superior slag erosion characteristics over the known zirconia-graphite standard slagline refractory.

EXAMPLE II

Based on the laboratory results set forth above involving the bar specimens, a full-sized, sub-entry nozzle 10, of the type depicted in the drawings, was prepared for trials containing a SiAlON-carbon sleeve 20 of the composition set forth in Table II. This nozzle having the aforementioned SiAlON-rich, carbon-bonded slagline sleeve was placed in a two-nozzle, bottom pour tundish at a steel mill and tested along with a nozzle having a standard zirconia-graphite slagline sleeve. The nozzles were used to cast three ladles of silicon steel having a total casting weight of 450 tons. Casting duration was three hours. Upon termination of the casting run, both nozzles were removed and examined for erosion wear depth at the slagline. The results are shown below.

|  | Zirconia-Graphite | SiAlON-Graphite |
|---|---|---|
| Slag Erosion Rate | 0.105 in/hr | 0.0653 in/hr |

Thus, the above results indicate that the SiAlON-graphite slagline sleeve of the present invention has substantially greater resistance to slag attack than the zirconia-graphite standard nozzle sleeve under actual steel casting conditions.

EXAMPLE III

In order to demonstrate the effectiveness of a SiAlON plus silicon nitride-graphite composition, a test sleeve of the composition set forth in Table III below was formulated and pressed into a slagline sleeve shape and sintered.

TABLE III

|  | Weight % |
|---|---|
| C | 30.0% |
| SiAlON (Z = 2) | 40.4% |
| Silicon Nitride | 21.4% |
| Silica | 5.0% |
| Boron | 2.1% |
| Other Oxides | 1.1% |

A 25 mm×25 mm test bar was cut from the sintered body and run against a standard zirconia-graphite composition of Table I. The test bars were rotated for ten minutes in a molten steel bath at 1650° C. covered with a mold powder slag. The following results were obtained.

|  | Zirconia-Graphite | SiAlON/Silicon Nitride |
|---|---|---|
| Slag Erosion Rate | 0.708 in/hr | 0.564 in/hr |

Thus, it is observed that the SiAlON plug silicon nitride-graphite refractory composition set forth in Table III exhibited superior slag erosion resistance in comparison with the standard zirconia-graphite composition.

EXAMPLE IV

In order to demonstrate the suitability of a SiAlON plus zirconia (ZrO$_2$) - graphite mixture as a slagline sleeve material, additional samples were cut from an isostatically pressed submerged entry nozzle in a manner similar to Example I. A conventional zirconia-graphite material of a composition set forth in Example I was used as the standard. The zirconia/SiAlON test samples designated ZS1 and ZS2 had chemical compositions which are given in Table IV, below.

TABLE IV

|  | ZS1 (Weight %) | ZS2 (Weight %) |
|---|---|---|
| C | 23.0 | 20.0 |
| SiAlON (Z = 1.5) | 36.5 | 17.0 |
| ZrO$_2$ | 34.0 | 56.0 |
| SiO$_2$ | 4.5 | 5.0 |
| B$_2$O$_3$ | 2.0 | 2.0 |

The two bars ZS1 and ZS2 containing varying amounts of SiAlON and zirconia grains along with a zirconia-graphite standard test bar were immersion tested in a manner similar to Examples I and II in a molten steel/slag environment at a temperature of approximately 1600° C. and with a rotation time of 10 minutes. The results of the slag erosion test are as follows:

|  | Zirconia-Graphite Standard | ZS1 | ZS2 |
|---|---|---|---|
| Slag Erosion Rate | 0.714 in/hr | 0.700 in/hr | 0.96 in/hr |

These test results show that good erosion resistance can be obtained using mixtures of zirconia and SiAlON plus graphite for the slagline sleeve of a sub-entry nozzle. The obvious advantage of mixing zirconia and SiAlON grain and powder is that the cost of the sintered body can be reduced by diluting the expensive SiAlOn with lower cost zirconia. The above data indicate that the ZS1 sample containing about 36.5% SiAlON and 34% zirconia with 23% carbon has a slag erosion rate slightly better than the zirconia-graphite standard. The ZS2 sample having a zirconia content of 56% and SiAlON content of 17% with a 20% carbon content exhibited a higher slag erosion rate than the zirconia-graphite standard. Even though the SiAlON plus zirconia product may exhibit a similar or slightly higher slag erosion rate than the zirconia-graphite standard, such as SiAlON/zirconia or silicon nitride/zirconia carbon bonded refractory would provide a longer service life than the standard zirconia-graphite sleeve due to a thermally improved crystallographic structure in the latter. As discussed previously herein, conventional zirconia-graphite slagline sleeves often lose mechanical strength during long casting sequences. The practical effect of this is that the cast must be terminated with a larger proportion of residual slagline sleeve left intact than is desirable. In other words, the zirconia-graphite slagline sleeve fractures while still retaining a substantial useful wall thickness. This tendency to prematurely fracture results from a mechanical loss in strength caused by a crystallographic change in the structure of zirconia which is accompanied by a sizable volume expansion. Additions of SiAlOn or silicon nitride, which do not undergo phase transformation, permit the sleeves to be more fully utilized due to the fact that the SiAlON and/or silicon nitride mixtures maintain mechanical strength in the sleeve during long casting sequences. Thus, even though the erosion rates are the same or slightly greater, using mixtures of zirconia and SiAlON and/or silicon nitride, the sleeve can be utilized to a greater extent than the standard zirconia-graphite sleeves which undergo the above-mentioned crystallographic phase transformation and resultant premature fracturing.

EXAMPLE V

The use of carbon-containing crucibles for melting ferrous and nonferrous metals is also well-known in the art. Crucibles must possess good thermal conductivity, resistance to thermal shock, mechanical strength, and resistance to attack by slags and molten metals. Most of these properties, except strength, are imparted to the crucible by the carbon addition, in the form of graphite, pitch, or resin. Refractory grain is added to provide mechanical strength and to improve the resistance to molten metals and slags. The ratio of carbon to refractory grain can vary depending on the expected application of the crucible.

We have found that carbon-bonded SiAlOn and silicon nitride compositions of the present invention are excellent refractories for use as a crucible material. These refractories have a low thermal expansion coefficient which yields improved thermal shock resistance. In addition, these materials exhibit improved resistance to molten slags and especially good resistance to certain non-ferrous metals, such as, for example, aluminum alloys. Two crucibles were prepared for testing by isostatically pressing the powder mixtures listed below, then firing the pressed pieces in a reducing atmosphere. The first test crucible was a conventional, carbon-bonded silicon carbide (SiC) of a composition set forth in Table V. The second test crucible was a carbon-bonded SiAlON ($Z=3$) having a composition also set forth in Table V. It is noted that the silicon carbide crucible contains 34.5% carbon while the SiAlON crucible also contains a like amount of carbon. Likewise, the silicon carbide crucible contains 55% silicon carbide while the Sialon contains 55% siAlON with the balance of the constituents, namely, boron oxide, silica and silicon, being identical in both test crucibles.

TABLE V

|  | Carbon-Bonded SiC Crucible (Weight %) | SiAlON - Carbon-Bonded Crucible (Weight %) |
|---|---|---|
| C | 34.5% | 34.5% |
| SiC | 55.0% | — |
| SiAlON | — | 55.0% |
| $B_2O_3$ | 4.0% | 4.0% |
| $SiO_2$ | 2.1% | 2.1% |
| Si | 3.4% | 3.4% |

Both test crucibles were filled with type 6061 aluminum alloy which was melted and then held in a molten state at 1000° C. for approximately 84 hours. The temperature was then elevated to 1275° C. and held for 9 hours.

The crucibles were cooled and sectioned to measure the depth of erosion an oxidation. The carbon-bonded silicon carbide standard crucible showed a reaction layer between the molten aluminum and crucible body of up to 0.20 inches. The silicon carbide crucible had also developed extensive pinholes throughout a body which reduced the effective wall thickness by approximately 90%. The carbon-bonded SiAlON crucible showed a slight reaction layer of only about 0.03 inches. There were no pinholes or evidence of surface reactivity in the SiAlON crucible and the effective crucible wall thickness was reduced by less than about 5%.

EXAMPLE VI

Refractory slide gate plates are used to control the flow of molten steel in various arrangements, such as from a ladle to a tundish; from a ladle to an ingot mold; or from a tundish to a continuous casting mold. Due to the critical nature of these refractory plates, excellent physical properties are required. The plates must possess good mechanical strength; resistance to thermal shock; resistance to steel melting and erosion; and surface hardness to withstand abrasion. The composition of such plates normally varies depending upon the type of steel being cast. Slide gate plates generally consist of a high percentage of aluminum oxide with some carbon additions. The carbon is added to help reduce melting and improve the thermal shock properties of the plate. A typical composition for a known high aluminum oxide plate is given in Table VI. In order to compare the properties of a refractory body having a composition of the present invention in the slide gate plate configuration, a test plate of SiAlON ($Z=2$) and carbon was prepared according to the chemistry set forth in Table VI. The SiAlON-carbon bonded plate was evaluated against the conventional high aluminum plate in a flame-spall test and an erosion test A. flame-spall test is usually employed to measure the thermal shock properties of a material. Excellent resistance to thermal shock is an important consideration in slide gate plate applications.

TABLE VI

|  | Alumina Plate (Weight %) | SiAlON Plate (Weight %) |
|---|---|---|
| Al2O3 | 76.0% | — |
| SiO2 | 9.5 | 2.1 |
| SiAlON |  | 88.2 |
| Carbon | 8.0 | 9.7 |
| ZrO2 | 7.5 | — |

In the flame-spall test employed herein, an oxygen-acetylene torch was run over the surface of the test plates from a distance of 0.5 inches. The measurements made in the test are qualitative, i.e., cracking, spalling, surface melting are observed within the range from "none" to "severe". The high alumina test plate was subjected to the flame-spall test and showed cracking and slight edge spalling. There was no surface melting observed. The SiAlON test plate was also subjected to the flame-spall test and exhibited no cracking or edge spalling. There was very slight surface melting observed. The lack of cracking is attributed to the very low thermal expansion of the SiAlON material.

A second test in the nature of a standard steel erosion test, similar to those set forth above in Examples I, II and III, was carried out in order to compare the erosion properties of the SiAlON plate with the high alumina standard composition. The erosion test was run at a temperature of 1600° C. with a rotation time of 10 minutes. The test results are shown below.

|  | High Alumina Plate | SiAlON Plate |
|---|---|---|
| Steel Erosion Rate | .126 in/hr | .490 in/hr |
| Slag Erosion Rate | .540 in/hr | .420 in/hr |

Steel Temperature was 1600° C. test; time was 10 minutes.

It is noted from the above that the SiAlON carbon-bonded test bar exhibited a higher erosion rate in molten steel than the alumina standard bar, while the SiAlON carbon-bonded material showed a lower erosion rate in the slag environment than the high alumina composition. Overall, the results of the flame-spall and slag/steel-erosion testing indicates that the SiAlON-carbon bonded refractory of the present invention is suitable for use as a slide gate plate material.

It is important to realize that the test conditions vary in each of the examples presented above. The steel and slag compositions are different in each of the tests as well as the temperatures employed which makes it quite inappropriate to make numerical comparisons between each of the erosion test of the various examples. Relative erosion comparisons are valid only within the limits of each test.

The above examples indicate that the preferred compositional range of our carbon-containing refractory material would be approximately as follows: elemental carbon from about 4–50% by weight; silicon nitride ($Si_3N_4$) and/or SiAlON ($Si_{6-z}Al_zO_zN_{8-z}$) from about 20–90% by weight, antioxidants, such as silicon carbide, silicon oxide, silicon or boron-containing compounds, from about 2–8% by weight; a carbonaceous binder selected from pitch, resin, or some other carbonaceous material from about 0–10%; and other refractory grains or powders known in the refractory art such as clay, alumina, zirconia, silica, silicon carbide, mullite, chromia, or the like, for diluting the mixture in an amount from about 0–70% by weight. The SiAlON powder or grain constituent may be of one composition or a blend of several compositions obeying the general formula $Si_{6-z}Al_zO_zN_{8-z}$, where "z" varies between a number greater than zero up to a value equal to or less than 5.

It is also noted that about 50% of the carbon content of the pitch or resin binder will remain in the refractory body after sintering in the carbon bond while the remainder of the carbon constituents in the binder are lighter hydrocarbons which will volatize off during the sintering step.

Of course, it is understood by those skilled in the art that the relative amounts of the various constituents set forth above would vary depending upon the intended use of the formed refractory body.

We claim:

1. A fired carbon-bonded refractory body consisting essentially of, by weight:
   (a) carbon from about 4% to 50% supplied predominantly from a graphite source;
   (b) fully reacted SiAlON in an amount of from about 20% to 90%, and wherein the SiAlOn has a composition $Si_{6-z}Al_zO_zN_{8-z}$, having one or more "z" values wherein $0 < z \leq 5$;
   (c) one or more members selected from the group consisting of clay, alumina, zirconia, silica, silicon carbide, mullite and chromia in an aggregate amount from 0% to about 70%; and
   (d) an antioxidant constituent comprising at least one member selected from the group consisting of silicon and boron containing compound in an amount from about 2% to 8% by weight.

2. The refractory body of claim 1 wherein a portion of the carbon content is supplied by a non-graphite carbonaceous binder in an amount up to about 5% by weight.

3. The refractory body of claim 2 wherein the non-graphite carbonaceous binder is supplied from a source comprising at least one member of the group consisting of pitch and resin.

4. A method of producing a refractory body comprising the steps of:
   (a) forming a mixture of particulate constituents consisting essentially of:
      (1) about 4% to 50% by weight carbon selected from a graphite source;
      (2) about 20% to 90% by weight of fully reacted SiAlON and wherein the SiAlON has a composition of $Si_{6-z}Al_zO_zN_{8-z}$, having one or more "z" values wherein $0 < z \leq 5$;
      (3) about 2% to 8% by weight of an antioxidant constituent comprising at least one member selected from the group consisting of silicon and boron containing compounds;
      (4) about 0% to 10% by weight of a non-graphite carbonaceous binder; and
      (5) one or more members selected from the group consisting of clay, alumina, zirconia, silica, silicon carbide, mullite and chromia in an aggregate amount from 0% to about 70% by weight;
   (b) pressing the particulate mixture into a desired preform configuration; and (c) densifying the preform by firing said mixture of constituents at about 800° C. to 1500° C. to produce a carbon-bonded refractory body particularly useful in molten metal and slag environments.

5. The method of claim 4 wherein graphite, SiAlON and zirconia form the major constituents of the particulate mixture, forming at least 90% by weight thereof in the aggregate.

6. A refractory body made in accordance with the method of claim 4.

* * * * *

UNITED STATES PATENT AND TRADEMARK OFFICE
CERTIFICATE OF CORRECTION

PATENT NO. : 4,871,698

Page 1 of 2

DATED : October 3, 1989

INVENTOR(S) : Mark K. Fishler and Dale B. Hoggard

It is certified that error appears in the above-identified patent and that said Letters Patent is hereby corrected as shown below:

Title page:

Under Foreign Patent Documents:
   "59-11071 3/1968 Japan." should read --59-110713 6/1984 Japan.--.
and
   "59-16176 7/1984 Japan . . . 501/97" should read --59-116176 7/1984 Japan . . . 501/97--.

Column 1 Line 47 after "carbon" insert --bonded--.

Column 2 Line 12 "soles" should read --solves--.

Column 3 Line 17 "6" should read --16--.

Column 3 Line 45 "Typically" should read --Typical--.

Column 4 Line 3 "plug" should read --plus--.

Column 7 Line 14 "SiAlOn" should read --SiAlON--.

Column 7 Line 40 "SiAlOn" should read --SiAlON--.

UNITED STATES PATENT AND TRADEMARK OFFICE
CERTIFICATE OF CORRECTION

PATENT NO. : 4,871,698

DATED : October 3, 1989

INVENTOR(S) : Mark K. Fishler and Dale B. Hoggard

It is certified that error appears in the above-identified patent and that said Letters Patent is hereby corrected as shown below:

Column 7 Line 66 "SiAlOn" should read --SiAlON--.

Column 8 Line 17 "Sialon" should read --SiAlON--.

Column 8 Line 17 "siAlON" should read --SiAlON--.

Column 9 Line 4 "test A." should read --test. A--.

Column 9 Line 58 "test" should read --tests--.

Claim 1 Line 27 Column 10 "SiAlOn" should read --SiAlON--.

Signed and Sealed this

Thirtieth Day of October, 1990

Attest:

HARRY F. MANBECK, JR.

*Attesting Officer*     *Commissioner of Patents and Trademarks*